United States Patent [19]

Kunimoto et al.

[11] Patent Number: 4,729,771
[45] Date of Patent: Mar. 8, 1988

[54] ABRASIVE SHEET AND PROCESS FOR PRODUCING THE SAME

[75] Inventors: Akihiro Kunimoto; Seiichirou Takabayashi, both of Ube, Japan

[73] Assignee: Ube Industries, Ltd., Yamaguchi, Japan

[21] Appl. No.: 910,946

[22] Filed: Sep. 24, 1986

[30] Foreign Application Priority Data

Sep. 27, 1985 [JP] Japan ............................... 60-212685

[51] Int. Cl.$^4$ ............................................... C09K 3/14
[52] U.S. Cl. ......................................... 51/298; 51/308; 51/309
[58] Field of Search ........................... 51/298, 308, 309

[56] References Cited

U.S. PATENT DOCUMENTS

| | | | |
|---|---|---|---|
| 3,385,684 | 5/1968 | Voter | 51/298 |
| 3,650,715 | 3/1972 | Brushek et al. | 51/298 |
| 3,651,012 | 3/1972 | Holub et al. | 51/298 |
| 4,221,572 | 9/1980 | Torimae et al. | 51/298 |
| 4,240,807 | 12/1980 | Kronzer | 51/298 |
| 4,317,660 | 3/1982 | Kramis et al. | 51/298 |
| 4,437,865 | 3/1984 | Parekh et al. | 51/298 |
| 4,643,740 | 2/1987 | Nicolson | 51/293 |

*Primary Examiner*—Paul Lieberman
*Assistant Examiner*—Willie J. Thompson
*Attorney, Agent, or Firm*—Burgess, Ryan & Wayne

[57] ABSTRACT

An abrasive sheet having an excellent flexibility, mechanical strength and heat resistance comprises an aromatic imide polymer matrix and abrasive particles having an average size of 0.1 to 50 μm and is prepared by evenly dispersing the abrasive particles in an organic polar solvent, mixing the resultant dispersion with a polymerization mixture consisting of an acid component comprising, as a major acid ingredient, a biphenyltetracarboxylic acid or an dianhydride thereof with a diamine component comprising an aromatic diamine, while polymerizing the acid and diamine components at 0° C. to 80° C. into an aromatic polyamic acid, forming the resultant dope dispersion into a thin layer and solidifying the thin layer while imidizing the aromatic polyamic acid into a corresponding aromatic imide polymer.

16 Claims, No Drawings

ABRASIVE SHEET AND PROCESS FOR PRODUCING THE SAME

BACKGROUND OF THE INVENTION (1) Field of the Invention

The present invention relates to an abrasive sheet and a process for producing the same. Particularly, the present invention relates to a flexible abrasive sheet having an excellent mechanical strength, heat and water vapor resistance, and satisfactory grinding and cutting properties, and a process for producing the same.

(2) Description of the Related Art

A conventional flexible abrasive sheet is an emery paper composed of a paper substrate and abrasive particles adhered to a surface of the paper substrate with an adhesive. This type of conventional flexible abrasive sheet is disadvantageous in that it has a poor mechanical strength and heat resistance, and unsatisfactory grinding properties, due to a poor mechanical strength of the paper substrate and an unsatisfactory bonding strength of the abrasive particles to the paper substrate. Accordingly, the conventional flexible abrasive sheet is usually not used for an industrial grinding tool or for the abrasion of articles having an extreme hardness or which are difficult to grind.

U.S. Pat. No. 3,385,684 discloses a grinding wheel surface portion comprising a matrix resin consisting of a phenol-formaldehyde resin or an essentially linear aromatic polyimide resin having a second order transition temperature of 250° C. or more and a room temperature modulus of at least 300,000 p.s.i., and abrasive particles of synthetic diamonds having a grit size of 200 to 100 Tyler screen size.

Also, U.S. Pat. No. 3,650,715 discloses an abrasive article comprising a matrix resin consisting of poly-N,N'(4,4'-oxydiphenylene) pyromellitimide, diamond particles, and compacted dendritic copper.

The above-mentioned grinding wheel surface portion or abrasive article is produced by molding a mixture of the matrix resin powder, abrasive (diamond) particles and, if necessary, an additive, in a mold and by heating the molded mixture at an elevated temperature under pressure.

The above-mentioned powder-molding method is not satisfactory to obtain a thin flexible abrasive sheet having a high heat resistance.

Accordingly, it is strongly desired in industry to obtain a thin flexible abrasive sheet and a process for producing the same which are completely free from the above-mentioned disadvantages.

SUMMARY OF THE INVENTION

An object of the present invention is to provide an abrasive sheet having excellent flexibility, mechanical strength, heat resistance, moisture resistance, and chemical resistance, and a process for producing the same.

The above-mentioned object can be obtained by the abrasive sheet of the present invention which comprises 20% to 98% by volume of a matrix consisting of an aromatic imide polymer resin which is a polymerization-imidization product of a tetracarboxylic acid component comprising, as a major acid ingredient, at least one member selected from the group consisting of biphenyltetracarboxylic acids and dianhydrides thereof with a diamine component comprising at least one aromatic diamine, and 2% to 80% by volume of abrasive particles having an average size of 0.1 to 50 μm and evenly dispersed in the matrix.

The above-mentioned abrasive sheet is produced by the process of the present invention which comprises the steps of evenly dispersing 2 to 80 parts by volume of abrasive particles having an averag size of 0.1 to 50 μm in an organic polar solvent; mixing the resultant dispersion with a polymerization mixture consisting of a tetracarboxylic acid component comprising, as a major acid ingredient, at least one member selected from the group consisting of biphenyltetracarboxylic acids and dianhydrides thereof, and a diamine component comprising at least one aromatic diamine, and polymerizing the acid and diamine components at a temperature of 0° C. to 80° C., to provide a dope dispersion consisting of a solution of the resultant aromatic polyamic acid dissolved in the organic polar solvent and the abrasive particles evenly dispersed in the aromatic polyamic acid solution; forming the dope solution into a thin layer thereof; and solidifying the thin layer of the dope solution by evaporating the organic polar solvent, while imidizing the aromatic polyamic acid to the corresponding aromatic imide polymer to provide an abrasive sheet, the polymerization mixture being in an amount necessary to provide the corresponding aromatic imide polymer in an amount of 20 to 98 parts by volume.

DESCRIPTION OF THE PREFERRED EMBODIMENTS

The abrasive sheet of the present invention is highly flexible and comprises 20% to 98% by volume, preferably 40% to 95% by volume, of an aromatic imide polymer resin matrix and 2% to 80% by volume, preferably 5% to 60% by volume of abrasive particles evenly dispersed in the matrix and usually has a thickness of from 10 to 500 μm, preferably 20 to 300 μm.

The abrasive particles usable for the present invention are not limited to specific types of abrasive particles, and the type of the abrasive particles can be determined in view of the intended use thereof. The abrasive particles have an average size of from 0.1 to 50 μm, preferably from 0.5 to 40 μm, and are effective for grinding or cutting.

Usually, the abrasive particles are selected from the group consisting of natural and artificial diamond, cubic boron carbide, silicon carbide, alumina, emery, spinel, garnet, and flint particles.

The abrasive particles usable for the present invention may be completely or partially coated by an inorganic or metallic coating material, for example, nickel-coated diamond and copper-coated diamond particles.

The aromatic imide polymer usable as a matrix or binder is a polymerization-imidization product of a tetracarboxylic acid component and a diamine component. The tetracarboxylic acid component comprises, as a major acid ingredient, at least one member selected from biphenyltetracarboxylic acids and dianhydrides thereof. The biphenyltetracarboxylic acids include 2,3,3',4'-biphenyltetracarboxylic acid and 3,3',4,4'-biphenyltetracarboxylic acid.

The tetracarboxylic acid component may contain, in addition to the major acid ingredient, an additional acid ingredient consisting essentially of at least one member selected from the group consisting of pyromellitic acid, 2,3,6,7-naphthalenetetracarboxylic acid, 3,4,3',4'-benzophenonetetracarboxylic acid, 2,2'-bis(3,4-dicarboxyphenyl)propane, bis(3,4-dicarboxyphenyl)sulfone, bis(3,4-dicarboxyphenyl)ether and anhydrides of the above-mentioned compounds, in an amount of 50 molar % or less, preferably 20 molar % or less.

The diamine component comprises at least one aromatic diamine selected from 4,4'-diaminodiphenylether, 3,4'-diaminodiphenylether, 4,4'-diaminodiphenylthioether, 4,4'-diaminodiphenylsulfone, 4,4'-diaminobenzophenone, 4,4'-diaminodiphenylmethane, 2,2-bis(4-aminophenyl)propane, and o, m and p-phenylenediamines.

The tetracarboxylic acid component and the diamine component are usually mixed in about equimolecular amounts, are polymerized to produce an aromatic polyamic acid and then imidized to produce the corresponding aromatic imide polymer.

The aromatic imide polymer usable for the present invention preferably has a logarithmic viscosity number of 0.1 to 7, more preferably 0.3 to 5, determined at a concentration of 0.5 g/100 ml in a solvent consisting of parachlorophenol at a temperature of 50° C.

The abrasive sheet of the present invention may further comprise a filler in an amount of 1 to 30% based on the sum of the volumes of the matrix and the abrasive particles. The filler usually consists of at least one member selected from graphite, $SiO_2$, SiC, $Al_2O_3$, $Fe_2O_3$, Cu, and Sn particles having an average size of 0.1 to 100 μm, preferably 0.5 to 50 μm.

In the abrasive sheet of the present invention, the aromatic imide polymer matrix preferably has a high heat resistance represented by the temperature of 450° C. or more, more preferably 500° C. or more, at which a test piece exhibits a weight loss of 5% by weight when heated at a heating rate of 10° C./min, and a small moisture content of 1.2% or less, more preferably 1.0% or less, determined in an equilibrium condition at a temperature of 50° C. at a relative humidity of 50%. When the aromatic imide polymer matrix exhibits the above-mentioned high heat resistance and small moisture content, the resultant abrasive sheet exhibits an excellent durability even if used at a high temperature under hard grinding or cutting conditions.

A preferable aromatic imide polymer matrix is prepared by polymerization-imidization of a tetracarboxylic acid component containing 50 molar % or more, more preferably 60 molar % or more, still more preferably 80 to 100 molar %, of 3,3',4,4'-biphenyltetracarboxylic acid, or a dianhydride thereof, with a diamine component containing 50 molar % or more, more preferably 60 molar % or more, still more preferably 80 to 100 molar % of 4,4'-diaminodiphenylether, which components are mixed in equimolar amounts. The resultant matrix having a large molecular weight gives an excellent heat resistance, durability, mechanical strength, and bonding strength of the abrasive particles to the matrix, of the resultant abrasive sheet.

Another preferable aromatic imide polymer matrix is produced by polymerization-imidization of a tetracarboxylic acid component containing 50 molar % or more, more preferably 60 molar % or more, still more preferably 80 to 100 molar %, of 3,3',4,4'-biphenyltetracarboxylic acid, or an anhydride thereof, with a diamine component containing 40 molar % or more, more preferably 50 molar or more, still more preferably 60 to 100 molar %, of at least one member selected from o, m and p-phenylenediamines, which two components are mixed in equimolar amounts.

The resultant high molecular weight aromatic imide polymer matrix gives a high durability, mechanical strength, heat resistance, elastic modulus in tension and thermal stability in dimensions, of the resultant abrasive sheet. Usually, this type of aromatic imide polymer exhibits a coefficient of heat expansion of $4.5 \times 10^{-5}$ cm/cm/° C. or less, preferably 1.2 to $4.0 \times 10^{-5}$ cm/cm/° C.

In the production of the abrasive sheet in accordance with the process of the present invention, in the first step, 2 to 80 parts by volume of abrasive particles having an average size of 0.1 to 50 μm are evenly dispersed in an organic polar solvent preferably in an amount of 5 to 5000 parts by volume.

The organic polar solvent preferably consists of at least one member selected from N-methyl-2-pyrrolidone, N,N-dimethylformamide, N,N-diethylformamide, N,N-dimethylacetamide, N,N-diethylacetamide, phenol, cresol, and halogenated phenols.

In the second step in the process of the present invention, the resultant dispersion is mixed with a polymerization mixture of a tetracarboxylic acid component comprising, as a major acid ingredient, at least one biphenyltetracarboxylic acid, or a dianhydride thereof, with a diamine component comprising at least one aromatic diamine, while polymerizing the acid and diamine components at a temperature of 0° C. to 80° C., preferably 0° C. to 60° C. and, for example, for 0.5 to 50 hours, preferably 1 to 30 hours, to prepare an aromatic polyamic acid having a high molecular weight. Thus, a dope dispersion containing the abrasive particles evenly dispersed in a solution of the aromatic polyamic acid in the organic polar solvent is obtained.

In the third step in the process of the present invention, the dope dispersion is formed into a thin layer.

In the fourth step in the process of the present invention, the thin layer of the dope dispersion is solidified by removing the organic polar solvent by an evaporation process, while the aromatic polyamic acid is imidized to a corresponding aromatic imide polymer at an elevated temperature or in the presence of an imidizing agent, to provide an abrasive sheet.

The abrasive sheet may be further heat-treated to complete the removal of the organic polar solvent and the imidization of the aromatic polyamic acid, if necessary.

In the first step, the abrasive particles are mixed in the organic polar solvent at a temperature not exceeding 60° C., preferably about room temperature, while the resultant mixture is stirred for 5 to 60 minutes, preferably 10 to 50 minutes, to provide a uniform dispersion.

In the preparation of the dispersion, if necessary, a coupling agent is further added to the organic polar solvent and the abrasive particles. The coupling agent preferably comprises at least one trialkoxysilane compound selected from α-N-phenylaminopropyl trimethoxysilane, N-β-(aminoethyl)-γ-aminopropyl trimethoxysilane, γ-aminopropyl trimethoxysilane, vinyl triethoxysilane, vinyl tris(2-methoxyethoxy)silane, β-(3,4-epoxycyclohexyl)ethyl trimethoxysilane, γ-glycidoxypropyl methoxysilane, and γ-mercaptopropyl trimethoxysilane.

The coupling agent is used prferably in an amount of 0.01% to 5%, more preferably 0.05% to 3%, based on the sum of the weights of the tetracarboxylic acid component and the diamine component.

The coupling agent is mixed, together with the abrasive particles, with the organic polar solvent and the mixture is stirred for 30 to 200 minutes, preferably 40 to 150 minutes.

The use of the coupling agent results in an enhanced grinding or cutting property of the resulting abrasive sheet.

Generally, the dispersion preferably contains 1% to 30% by weight, preferably 3 to 20% by weight, of the abrasive particles.

In the second step, the mixing procedure of the dispersion with the polymerization mixture, which stirring the mixture, is carried out in any one of the following ways.

(i) The whole amount of the diamine component is added to the dispersion at once and dissolved in the solvent and, thereafter, the tetracarboxylic acid component is added at once or little by little to the dispersion and dissolved in the solvent.

(ii) The whole amount of the tetracarboxylic acid component is added to the dispersion at once and dissolved in the solvent and, thereafter, the diamine component is added at once or little by little to the dispersion and dissolved in the solvent.

(iii) The tetracarboxylic acid component and the diamine component are added at once to the dispersion. Alternatively, the tetracarboxylic acid component and the diamine component are added little by little in equimolar amounts to the dispersion.

(iv) Each of the tetracarboxylic acid component and the diamine component is dissolved in the same amount of organic polar solvent as that used in the dispersion, and each resultant solution is added to the dispersion in a similar way as any one of the above-mentioned (i) to (iii).

In the second step, the resultant aromatic polyamic acid preferably has a logarithmic viscosity number of 0.1 to 7, more preferably 0.3 to 5, determined at a concentration of 0.5 g/100 ml in a solvent consisting of N,N-dimethylacetamide at a temperature of 30° C. Also, the resultant dope dispersion preferably contains the aromatic polyamic acid in an amount of 3 to 50% by weight, more preferably 5 to 30% by weight, and preferably has a rotation viscosity of 1 to 50,000 poise, more preferably 5 to 30,000 poise, at a temperature of 25° C. The dope dispersion having the above-mentioned concentration and viscosity usually exhibits a satisfactory film-forming property and an excellent uniformity in the distribution of the abrasive particles in the resultant abrasive sheet.

In the third step in the process of the present invention, a thin layer of the dope dispersion is formed by any continuous of non-continuous film-forming method. For example, the dope dispersion is spread on a plane, smooth surface of a substrate, for example, a glass plate, metal plate, metal drum or metal belt at a temperature of 5 to 120° C. to form a thin layer thereof having a uniform thickness of, for example, 20 to 1000 μm.

In the fourth step in the process of the present invention, the thin layer of the dope dispersion is solidified by evaporation of the organic polar solvent to form an abrasive sheet, while the aromatic polyamic acid is converted to the corresponding aromatic imide polymer. The solidification is carried out by heating the thin layer at an elevated temperature of 50° C. to 150° C., if necessary. The solidification may be carried out under an ordinary atmospheric pressure or a reduced pressure, or under a flow of inert gas.

The solidification procedure may be followed by an additional heating procedure applied to the resultant abrasive sheet at a temperature of 200° C. to 550° C., preferably 250° C. to 500° C., in a heating oven to complete the evaporation of the organic polar solvent and the imidization of the aromatic polyamic acid. The additional heating procedure is also effective for firmly fixing the abrasive particles within the aromatic imide polymer matrix and for enhancing the flexibility and the dimensional heat resistance of the abrasive sheet.

The additional heating procedure can be applied to the abrasive sheet either while it is still on the thin layer-forming substrate or when separated therefrom.

The abrasive sheet of the present invention contains the abrasive particles firmly fixed to and held by the aromatic imide polymer matrix derived from the specific biphenyltetracarboxylic acid-containing acid component.

The abrasive sheet exhibits excellent mechanical properties, for example, elastic modulus in tension and folding endurance measured by an MIT type fold tester; an excellent heat resistance, which is represented by weight loss (%) at a temperature of 500° C.; an excellent moisture resistance, which is represented by equilibrium moisture content at a temperature of 25° C. at a relative humidity of 50%; and an excellent chemical resistance. Accordingly, the abrasive sheet of the present invention exhibits an excellent grinding or cutting property and durability at an elevated temperature and a superior chemical resistance under the application of an abrasive liquid thereto, and can be used over a long period of time.

The abrasive sheet having the above-mentioned advantages can be industrially produced by the process of the present invention at a high reproductivity.

The present invention will be further explained by way of specific examples, which, however, are merely representative and do not restrict the scope of the present invention in any way.

EXAMPLE 1

Preparation of Dope Dispersion Containing Aromatic Polyamic Acid and Abrasive Particles A cylinder type polymerization vessel having an inside volume of 2 l was charged with 800 g (570 ml) of N,N-dimethylacetamide (solvent), and then with 70.64 g of diamond particles having an average size of 5 μm. The mixture was stirred for about 30 minutes to prepare a uniform dispersion.

The dispersion was mixed gradually with 80.99 g of 4,4'-diaminodiphenylether for about 2 minutes, and then, stirred at a temperature of 30° C. for 30 minutes to completely dissolve the diamine compound in the solvent in the dispersion.

Then, 107.17 g of 3,3',4,4'-biphenyltetracarboxylic dianhydride was gradually added to the diamine compound-containing dispersion for 5 minutes, and then, stirred at a temperature of 30° C. for 2 hours to completely dissolve the tetracarboxylic dianhydride compound in the solvent and to polymerize the tetracarboxylic dianhydride compound with the diamine compound.

Finally, 11.84 g of 3,3',4,4'-biphenyltetracarboxylic dianhydride was gradually added to the polymerization mixture containing dispersion and then stirred at a temperature of 30° C. for 3 hours to provide a dope dispersion containing an aromatic polyamic acid and the diamond particles.

The dope dispersion contained the aromatic polyamic acid in a concentration of 20% by weight and exhibited a rotation viscosity of 1000 poise at a temperature of 30°

C. The aromatic polyamic acid in the dope dispersion had a logarithmic viscosity number of 1.56 determined at a concentration of 0.5 g/100 ml in a solvent consisting of N,N-dimethylacetamide at a temperature of 30° C.

Formation of Abrasive Sheet

The dope dispersion was spread on a horizontal surface of a glass plate by an applicator to form a uniform thin layer of the dope dispersion.

The thin layer of the dope dispersion was solidified on the glass plate by blowing hot air thereover at a temperature of about 120° C. to evaporate the solvent.

The resultant solidified sheet, which contained the solvent in an amount of about 30% by weight, was separated from the glass plate and placed in a heating oven, while holding the sheet by a pin tenter. The sheet was heat treated in the oven by blowing hot air at a temperature of about 300° C. to 450° C. to completely eliminate the solvent from the sheet and to imidize the aromatic polyamic acid to the corresponding aromatic 'imide polymer.

The resultant abrasive sheet had a thickness of 60 μm and contained 12.3% by volume of the diamond particles evenly dispersed in the aromatic imide polymer matrix.

The abrasive sheet was subjected to practical abrasion tests under various conditions. It was confirmed that the abrasive sheet exhibited an excellent durability and grinding property even at a high tempera- ture.

The abrasive sheet exhibited the physical and mechanical properties as shown in Table 1.

EXAMPLE 2

Preparation of Dope Dispersion Containing Aromatic Polyamic Acid and Abrasive Particles A cylindrical polymerization vessel having a capacity of one liter was charged with 240 g (225 ml) of a solvent consisting of N,N-dimethylacetamide and then, with 20 g of diamond particles having an average size of 5 μm and 0.307 g of a coupling agent consisting of γ-N-phenylaminopropyl trimethoxysilane, while stirring the solvent. The mixture was stirred for 60 minutes at room temperature to provide a dispersion.

The dispersion was gradually mixed with 16.13 g of p-phenylenediamine for about 2 minutes and the mixture was stirred at 30° C. for 30 minutes to completely dissolve the diamine compound in the solvent in the dispersion.

Additionally, 3,3',4,4'-biphenyltetracarboxylic dianhydride in an amount of 39.49 g was gradually added to the diamine compound-dissolved dispersion for 5 minutes, and the resultant mixture was stirred at 30° C. for 2 hours to completely dissolve the tetracarboxylic dianhydride compound in the solvent in the dispersion and to polymerize the tetracarboxylic dianhydride compound with the diamine compound.

Finally, 4.39 g of 3,3',4,4'-biphenyltetracarboxylic dianhydride was gradually added to the polymerization mixture-containing dispersion and then the resultant polymerization mixture-containing dispersion was stirred at 30° C. for 3 hours to complete the polymerization.

The resultant dope dispersion contained a solution of an aromatic polyamic acid in the solvent and the diamond particles evenly dispersed in the aromatic polyamic acid solution and exhibited a rotation viscosity of 1300 poise at 30° C.

The aromatic polyamic acid was in a concentration of 20% by weight in the dope dispersion and exhibited a logarithmic viscosity number of 1.72 determined at a concentration of 0.5 g/100 ml in a solvent consisting of N,N-dimethylacetamide at 30° C.

Formation of Abrasive Sheet

The dope dispersion was converted to a solidified and heat treated sheet in the same manner as that described in Example 1.

The resultant abrasive sheet contained 12.2% by volume of the diamond particles evenly dispersed in the aromatic imide polymer matrix, and had a thickness of 80 μm.

It was confirmed that the abrasive sheet had an excellent durability and grinding property even under high temperature conditions.

The physical and mechanical properties of the abrasive sheet are shown in Table 1.

COMPARATIVE EXAMPLE 1

A dispersion was prepared in accordance with the same method as that described in Example 2 except that a coupling agent was not added thereto.

The dispersion was gradually mixed with 28.72 g of 4,4'-diaminodiphenylether for about 2 minutes and then stirred at 30° C. for 30 minutes to completely dissolve the diamine compound in the solvent in the dispersion.

Next, 28.15 g of pyromellitic dianhydride was gradually added to the diamine compound-containing dispersion, and then stirred at 30° C. for 2 hours to completely dissolve the diamine compound in the solvent in the dispersion and to polymerize the diamine compound with the pyromellitic dianhydride.

Finally, the polymerization mixture-containing dispersion was further mixed gradually with 3.13 g of pyromellitic dianhydride, and then stirred at 30° C. for 3 hours to complete the polymerization.

The resultant dope dispersion contained a solution of a comparative aromatic polyamic acid in the solvent and the diamond particles evenly dispersed in the aromatic polyamic acid solution, and exhibited a rotation viscosity of 2800 poise at 30° C.

The aromatic polyamic acid was in a concentration of 20% by weight in the dope dispersion and exhibited a logarithmic viscosity number of 1.86 determined in a concentration of 0.5 g/100 ml in a solvent consisting of N,N-dimethylacetamide at 30° C.

The dope dispersion was converted to an abrasive sheet by the same procedures as those described in Example 1.

The resultant comparative abrasive sheet contained 12.5% by volume of the diamond particles evenly distributed in an aromatic imide polymer matrix, and had a thickness of 90 μm.

It was confirmed that the grinding property of the comparative abrasive sheet deteriorate with the lapse of time at a high temperature and was therefore unsatisfactory.

The physical and mechanical properties of the comparative abrasive sheet are indicated in Table 1.

TABLE 1

| Item | Example 1 | Example 2 | Comparative Example 1 |
|---|---|---|---|
| Tensile strength (kg/mm$^2$) | 11.0 | 19.0 | 10.0 |
| Ultimate elongation (%) | 18 | 5 | 38 |
| Elastic modulus (kg/mm$^2$) | 580 | 960 | 380 |

TABLE 1-continued

| Item | Example 1 | Example 2 | Comparative Example 1 |
|---|---|---|---|
| Folding endurance (the number of folding operations) | 26400 | 1000 | 5350 |
| Heat weight loss (%) while heated from 0° C. to 500° C. | 1.1 | 0.5 | 1.3 |
| Equilibrium moisture content (%) at 50° C., 50% RH | 0.8 | 0.6 | 1.3 |

We claim:

1. A thin, flexible abrasive sheet having a thickness of from 10 to 500 μm, consisting essentially of:
   20 to 98% by volume of a matrix consisting essentially of an aromatic imide polymer resin which is a polymerization-imidization product of a tetracarboxylic acid component comprising, as a major acid ingredient, at least one member selected from the group consisting of biphenyltetracarboxylic acids and dianhydrides thereof with a diamine component comprising at least one aromatic diamine, and
   2 to 80% by volume of abrasive particles selected from the group consisting of natural and artificial diamond, cubic boron carbide, silicon carbide, alumina, emery, spinel, garnet and flint particles having an average a size of 0.1 to 50 μm evenly dispersed in the matrix.

2. The abrasive sheet as claimed in claim 1, wherein the aromatic imide polymer resin has a logarithmic viscosity number of 0.1 to 7 determined at a concentration of 0.5 g/100 ml in parachlorophenol at a temperature of 50° C.

3. The abrasive sheet as claimed in claim 1, wherein the tetracarboxylic acid component contains 50 molar % of at least one member selected from aromatic biphenyl-tetracarboxylic acids and dianhydrides thereof.

4. The abrasive sheet as claimed in claim 1, wherein the biphenyl tetracarboxylic acids and dianhydrides thereof are selected from 2,3,3',4'biphenyltetra-carboxylic acid, 3,3',4,4'-biphenyltetracarboxylic acid and dianhydrides thereof.

5. The abrasive sheet as claimed in claim 1, wherein the aromatic diamine is selected from the group consisting of 4,4'-diaminodiphenylether, 3,4'-diaminodiphenylether, 4,4'-diaminodiphenylthioether, 4,4'-diaminodiphenylsulfone, 4,4'-diaminobenzophenone, 4,4'-diaminodiphenylmethane, 2,2-bis(4-aminophenyl)-propane,, and o, m and p-phenylenediamines.

6. The abrasive sheet as claimed in claim 1, wherein the tetracarboxylic acid component contains at least 50 molar % of 3,3',4,4'-biphenyltetracarboxylic acid or its dianhydride, and the diamine, component contains at least 50 molar % of 4,4'-diaminodiphenylether.

7. The abrasive sheet as claimed in claim 1, wherein the tetracarboxylic ,acid component contains at least 50 molar % of 3,3', 4,4'-biphenyltetracarboxylic acid or a dianhydride thereof, and the diamine component contains at least 40 molar % of at least one member selected from o, m and p-phenylenediamines.

8. A process for producing an abrasive sheet comprising the steps of:
   evenly dispersing 2 to 80 parts by volume of abrasive particles having an average size of 0.1 to 50 μm in an organic polar solvent;
   mixing the resultant dispersion with a polymerization mixture consisting essentially of a tetracarboxylic acid component comprising, as a major acid ingredient, at least one member selected from the group consisting of biphenyltetracarboxylic acids and dianhydrides thereof and a diamine component comprising at least one aromatic diamine;
   polymerizing the acid and diamine components at a temperature of 0° C. to 80° C., to provide a dope dispersion consisting essentially of a solution of an aromatic polyamic acid dissolved in the organic polar solvent having the abrasive particles evenly dispersed in the aromatic polyamic acid solution;
   forming the dope dispersion into a thin layer thereof; and
   solidifying the thin layer of the dope dispersion by evaporating the organic polar solvent,
   imidizing the aromatic polyamic acid to the corresponding aromatic imide polymer to provide an abrasive sheet, and
   the polymerization mixture being provided in an amount necessary to provide the corresponding aromatic imide polymer in an amount of 20 to 98 parts by volume of the abrasive sheet.

9. The process as claimed in claim 8, wherein the organic polar solvent consist essentially of at least one member selected from the group consisting of N-methyl-2pyrrolidone, N,N-dimethylformamide, N,N-diethylformamide, N,N-dimethylacetamide, N,N-diethylacetamide, phenol, cresol, and halogenated phenols.

10. The process as claimed in claim 8, wherein the dispersion of the abrasive particles in the organic polar solvent further comprises a coupling agent consisting essentially of at least one member selected from the group consisting essentially of α-N-phenylaminopropyl trimethoxysilane, N-β-(aminoethyl)-γ-aminopropyl trimethoxysilane, γ-aminopropyl triethoxysilane, vinyl triethoxysilane, vinyl tris(2-methoxyethoxy)silane, β-(3,4-epoxycyclohexyl)ethyl trimethoxysilane, γ-glycidoxypropyl methoxysilane and γ-mercaptopropyl trimethoxysilane.

11. The process as claimed in claim 8, wherein the dispersion of the abrasive particles in the organic polar solvent contains 1 to 30% by volume of the abrasive particles.

12. The process as claimed in claim 8, wherein the thin layer of the dope dispersion is formed at a temperature of 5°to 120° C.

13. The process as claimed in claim 8, wherein the thin layer of the dope dispersion has a thickness of 20 to 1000 μm.

14. The process as claimed in claim 8, wherein the solidifying step for the thin layer of the dope dispersion is carried out at a temperature of 50° C. to 150° C.

15. The process as claimed in claim 8, wherein the solidified abrasive sheet is further heat treated at a temperature of 200° C. to 550° C.

16. An abrasive sheet comprising 20% to 98% by volume of a matrix comprising an aromatic imide polymer resin which is a polymerization-imidization product of a tetracarboxylic acid component comprising, as a major acid ingredient, at least one member selected from the group consisting of biphenyltetracarboxylic acids and dianhydrides thereof with adiamine component comprising at least one aromatic diamine, and 2% to 80% by volume of abrasive particles having an average size of 0.1 to 50 μm evenly dispersed in the matrix, produced by the process which comprises:

evenly dispersing 2 to 80 parts by volume of abrasive particles having an average size of 0.1 to 50 μm in an organic polar solvent;

mixing the resultant dispersion with a polymerization mixture consisting essentially of a tetracarboxylic acid component comprising, as a major acid ingredient, at least one member selected from the group consisting of biphenyltetracarboxylic acids and dianhydrides thereof and a diamine component comprising at least one aromatic diamine;

polymerizing the acid and diamine components at a temperature of 0° C. to 80° C., to provide a dope dispersion consisting essentially of a solution of an aromatic polyamic acid dissolved in the organic polar solvent having the abrasive particles evenly dispersed in the aromatic polyamic acid solution;

forming the dope dispersion into a thin layer thereof; and solidifying the thin layer of the dope dispersion by evaporating the organic polar solvent, imidizing the aromatic polyamic acid to the corresponding aromatic imide polymer to provide an abrasive sheet, and the polymerization mixture being provided in an amount necessary to provide the corresponding aromatic imide polymer in an amount of 20 to 98 parts by volume of the abrasive sheet.

* * * * *